INVENTOR.
GREGORY J. GANLEY
DOUGLAS C. SANFORD
ATTORNEY

Fig. 3

INVENTOR.
GREGORY J. GANLEY
DOUGLAS C. SANFORD
ATTORNEY

FIG. 5

Oct. 22, 1963  G. J. GANLEY ET AL  3,108,183
AIR DATA COMPUTING APPARATUS
Filed Oct. 31, 1957  7 Sheets-Sheet 6

INVENTOR.
GREGORY J. GANLEY
DOUGLAS C. SANFORD
BY
ATTORNEY

INVENTOR.
GREGORY J. GANLEY
DOUGLAS C. SANFORD
BY
ATTORNEY

United States Patent Office 3,108,183
Patented Oct. 22, 1963

3,108,183
AIR DATA COMPUTING APPARATUS
Gregory J. Ganley, Minneapolis, and Douglas C. Sanford, Princeton, Minn., assignors to Minneapolis-Honeywell Regulator Company, Minneapolis, Minn., a corporation of Delaware
Filed Oct. 31, 1957, Ser. No. 693,641
12 Claims. (Cl. 235—151)

This invention relates to the field of airborne computers and more particularly to air data computing apparatus.

It is generally known that the speed ranges of fighter, interceptor and other aircraft have been increased from relatively slow speeds to speeds in excess of the speed of sound, and that as the aircraft approaches the speed of sound, certain inaccuracies in the air data measuring systems appear. The greatest inaccuracy is associated with the static pressure sensor and it has been shown as the speed of the aircraft increases, especially near the speed of sound, the inaccuracy reaches its largest value and must be corrected if a true value of static pressure is going to be maintained.

Previously, a method of compensating for the inaccurate static pressure received at the static pressure sensor was to locate the static pressure source on most aircraft a definite distance away from the airframe or to locate the static pressure source on the airframe in an undisturbed region of the relative air stream, however this method is not always effective.

A method of correction for the inaccurate static pressure received at the static pressure sensor is to compute a corrective signal as a predictable function of aircraft velocity. More recently this aircraft velocity has been referred to in terms of Mach number which may be defined as the ratio of the velocity of the aircraft to the speed of sound at that same point, or of the velocity of the air passing over the aircraft frame to the speed of sound.

The present invention employs a computer to compute a correction quantity to correct the inaccurate static pressure. Operation of the computer is based on the known relationship of indicated static pressure, true static pressure, and Mach number, which can be determined from dynamic data obtained for example by use of a test boom, extending the static and total pressure orifices into air undisturbed by aircraft movement. This computer receives inputs of indicated static pressure, total pressure and in some cases angle of attack which are developed into signals representative of the logarithms of the conditions and used in the computer to develop a correction signal as a function of said conditions. The correction signal is then combined with the logarithm of indicated static pressure to derive a correct value for static pressure so that correct values of parameters relating to static pressure may be developed in other parts of the computer. The present invention utilizes the ratio of total pressure to indicated static pressure for computing the correction quantity, instead of the ratio of total pressure to corrected static pressure, because the inaccuracies are reduced in the system.

It has also been determined that if the ratio of total pressure to indicated static pressure is used to compute the correction signal, there is an indeterminate area in the range of values for this ratio in which the correction signal may be suddenly changed from a finite value to a zero value as the ratio approaches a value representative of Mach one. By changing the value of the correction signal in the indeterminate area just described, any instability or uncertainty in the system is reduced because it will be remembered that the ratio of total pressure to indicated static pressure contains the correction quantity since the indicated static pressure is made up of the static pressure and the correction quantity. Since the correction quantity cannot suddenly change from a finite value to a zero value, or negative value, the computer may change the value of the correction signal in this indeterminate area to reduce any instability in the system. On the other hand, if the ratio of total pressure to corrected static pressure is used to define the correction quantity, it has been necessary to undercorrect the quantity needed to produce the correction signal in order to prevent instability in the system. Thus, if the ratio of total pressure to true static pressure is used, as the aircraft passes through the transonic region, a greater inaccuracy exists about the Mach one point. Therefore, a distinguishing feature of our computer is the introduction of the sudden change of the correction quantity or signal, which is derived from a ratio of total pressure to indicated static pressure, at a point along the discontinuous portion of the curve which describes the correction value.

It is a general object of the present invention to provide improved means for giving a signal representative of corrected static pressure which may be combined with other signals for use with other airborne apparatus.

Another object of this invention is to provide a single instrument which may be used to provide correct pressure signals for navigation, fire control, bombing, and other aircraft systems avoiding duplication of the pressure instruments.

Another object of this invention is to provide means for introducing a correction quantity into the computer in such a manner as not to cause instability or oscillations in the system.

A further object of this invention is to provide a computer which has the correction quantity developed as a function of total pressure and indicated static pressure.

Another object of this invention is to provide a computer which computes the ratio of total pressure to static pressure.

Another object of this invention is to provide a computer which computes true static pressure as a function of total pressure and indicated static pressure.

These and other features of the invention will be understood more clearly and fully from the following detailed description and accompanying drawings in which.

Figure 1:
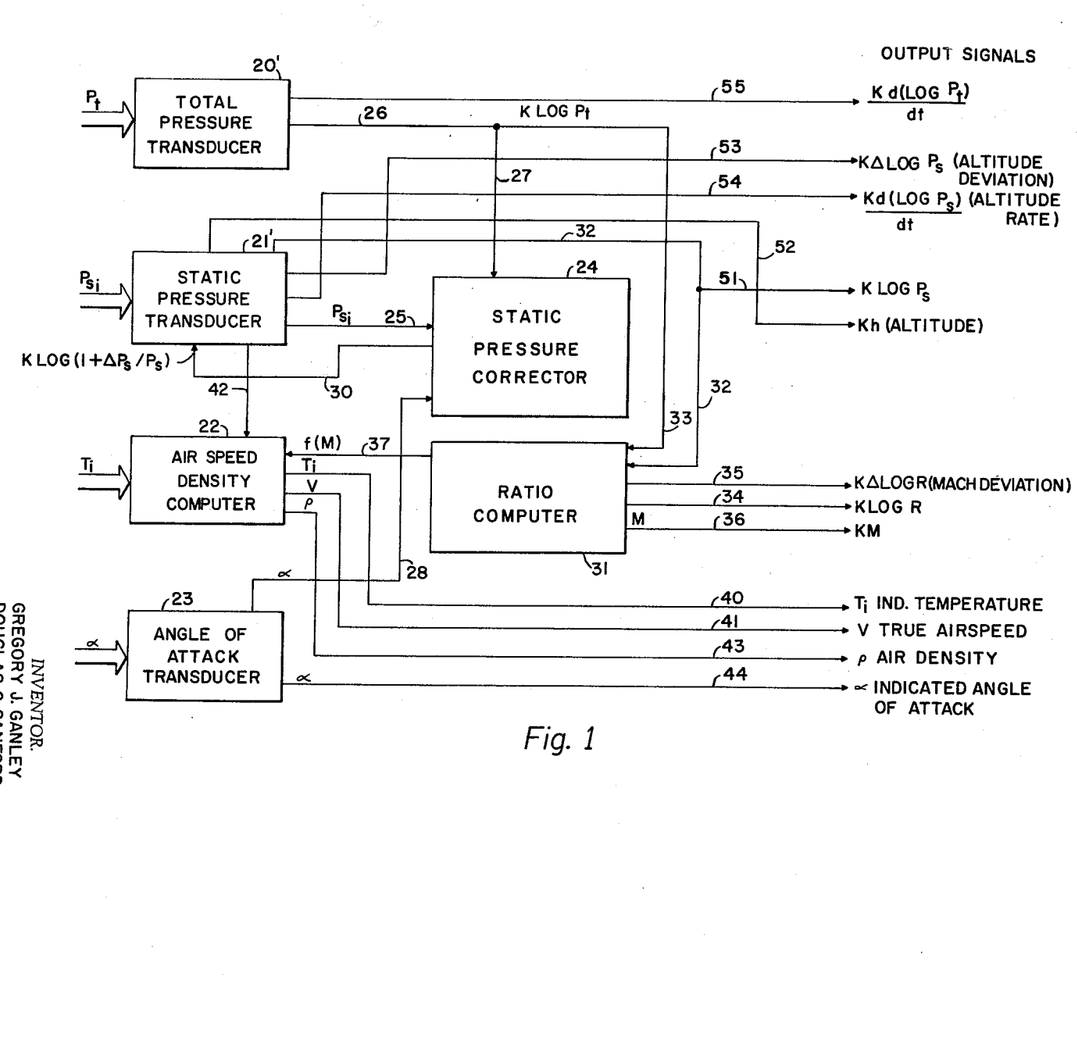
FIGURE 1 is a block diagram exhibiting in generalized form the components required to make an air data computer of which my invention comprises a portion.

FIGURE 1 discloses a total pressure transducer 20' which has a total pressure or Pitot pressure $P_t$ as an input. A static pressure transducer 21' receives an indicated static pressure $P_{si}$. An air speed-density computer 22 receives an indicated temperature $T_i$ signal and an angle of attack transducer 23 receives an angle of attack signal $\alpha$. A static pressure corrector 24 is energized by the $P_{si}$ signal through a connecting means 25 and by the $P_t$ signal through a pair of connecting means 26 and 27. Angle of attack transducer 23 supplies angle of attack signal $\alpha$ to static pressure corrector 24 through a connecting means 28, to be used as one of the inputs to the error correcting means of the static pressure corrector. A correction signal $\Delta P_s$, is computed in static pressure corrector 24 and returned to static pressure transducer 21' through a connecting means 30 as a $$K \log \left(1+\frac{\Delta P_s}{P_s}\right)$$

signal. A corrected value of static pressure $K \log P_s$ is sent to a ratio computer 31 through a connecting means 32. Connecting means 26 and a connecting means 33 supply a $K \log P_t$ signal to ratio computer 31.

The sections of the air data computer just described constitute the area of general importance in that the main purpose of the air data computer has been performed, i.e., to produce a correction quantity which will correct the pressure received by static pressure transducer 21'. It is this area of importance where the novelty of our invention lies.

Ratio computer 31 produces an output signal $K \log R$ on a connecting means 34 which is equal to the logarithm of total pressure divided by static pressure. Also obtained from ratio computer 31 is a $K\Delta \log R$ signal which is designated Mach Deviation and this is received as an output on a connecting means 35. A KM signal is obtained as an output from ratio computer 31 on a connecting means 36 and a signal as a function of Mach number $f(M)$ is sent to air speed-density computer 22 from ratio computer 31 through a connecting means 37. The indicated temperature signal $T_i$ is obtained as an output from air speed-density computer 22 through a connecting means 40, and the signal as a function of Mach number $f(M)$ is corrected for temperature and is presented as an output signal of true airspeed V on a connecting means 41. Air speed-density computer 22 is connected to static pressure transducer 21' through a connecting means 42 to receive a static pressure signal $P_s$ and produces an air density signal $\rho$ when combined with temperature and this is presented as an output on a connecting means 43. A direct signal from the angle of attack transducer 23 may be supplied as an output signal of angle of attack $\alpha$ on a connecting means 44. Also obtainable from static pressure transducer 21', is an output signal of $K \log P_s$ obtained on connecting means 32 and a connecting means 51. By suitable means, a signal equal to $Kh$, representative of altitude, is obtained on a connecting means 52. An incremental signal $K\Delta \log P_s$, defined as Altitude Deviation, is obtained as an output on connecting means 53 and an altitude rate signal of $$\frac{Kd (\log P_s)}{dt}$$

is obtained as an output on a connecting means 54. Total pressure transducer 20' supplies a rate output signal of $$\frac{Kd (\log P_t)}{dt}$$

on a connecting means 55. An air data computer may have a greater or smaller number of inputs and outputs as required for a particular application. Thus it may be seen that a device such as this produces a number of signals all of which depend directly or indirectly upon the static pressure as a true quantity.

Figure 2:
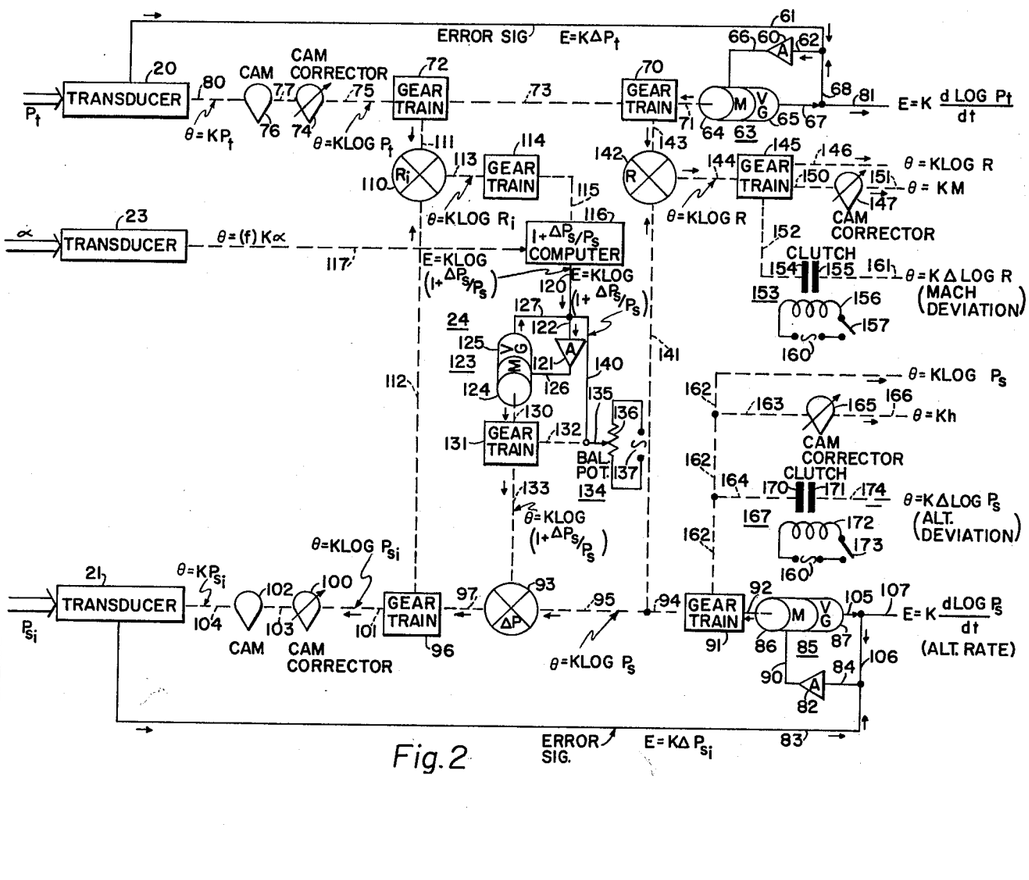
FIGURE 2 is a block diagram showing the general configuration used in computing a true static pressure signal.

The block diagram of FIGURE 2 shows the important features of the air data computer where total pressure transducer 20 provides a signal in the nature of a voltage which is sent to an amplifier 60 through a pair of connecting leads 61 and 62. A motor generator combination 63 comprises a motor 64 and a velocity generator 65 which are connected to a common shaft 223 shown in FIGURE 3. Motor generator combination 63 may be of the type shown in the Riggs Patent 2,408,813. Motor 64 is connected to amplifier 60 to receive the amplified signal through a connecting lead 66. As the armature of motor 64 rotates, velocity generator 65 is rotated to produce a rate signal which is returned to amplifier 60 through a pair of connecting leads 67 and 68 and connecting lead 62. As the armature of motor 64 rotates, it drives a gear train 70 through a shaft 71 and the flow of power continues from gear train 70 to a gear train 72 through another shaft 73 connected to gear train 70. A cam corrector 74 is driven by gear train 72 through a connecting shaft 75 and a cam 76 is in turn driven from cam corrector 74 through a connecting shaft 77. Cam corrector 74 may be of the type shown in the Shapiro Patent 2,514,420 or of the type shown in the more recently published article entitled, "Error Compensating Coupling for Rotary Controls," in the September issue of "Electrical Manufacturing." Cam 76 has a logarithm function cut on its surface so that the output is substantially a constant K multiplied by the anti-logarithm of total pressure. Logarithm functions are chosen because of the relative ease with which ratios may be created in the computer. For our invention, mechanical differentials have been chosen to perform the function of algebraically summing the logarithm quantities to derive the desired ratio. Certain errors may be introduced into cam 76 in the process of cutting the logarithm function on the cam. Cam corrector 74 is used to provide a correction for the errors introduced by cam 76 and to correct any non linear errors existing in the transducer and gear trains. Transducer 20 is therefore driven to a balance position by cam 76 through a connecting shaft 80. Thus the motor drives shaft 71, gear train 70, shaft 73, gear train 72, and shaft 75 to a value of $K \log P_t$ while the shaft 80 connecting transducer 20 to cam 76 is driven to a position of $KP_t$, and there exists along the gear train and connecting shafts a function of the logarithm of the total pressure $P_t$. It is therefore apparent that an output signal taken from velocity generator 65 and supplied as an output signal through a connecting lead 81 is equal to $$\frac{Kd \log P_t}{dt}$$

In like manner a static pressure transducer 21 provides an electrical signal which is sent to an amplifier 82 through a pair of connecting leads 83 and 84. A motor generator combination 85 comprises a motor 86 and a velocity generator 87 connected by a common shaft 281, shown in FIGURE 4. The signal received from transducer 21 which is amplified in amplifier 82 is sent to motor 86 through a connecting lead 90 and as motor 86 rotates, it drives a gear train 91 through a connecting shaft 92. Gear train 91 is connected to a mechanical differential 93 by a pair of shafts 94 and 95. Differential 93 drives a gear train 96 through a connecting shaft 97. Differential 93 as well as any of those yet to be described are of the well known mechanical gear type which have two inputs and produces an algebraic sum of the two inputs as an output. A cam corrector 100 is driven by gear train 96 through a connecting shaft 101 and in turn, a cam 102 is driven from cam corrector 100 by a connecting shaft 103. Cam corrector 100 is of the same type as cam corrector 74 previously described. Transducer 21 is driven to a signal null balance condition from cam 102.

through a connecting shaft 104. Cam 102 is of the same type as cam 76 just previously described. A similar operation takes place between cam 102 and corrector 100 as was described in regards to the coaction between cam 76 and cam corrector 74. Thus motor 86 transmits power to shaft 92, gear train 91, shaft 94, shaft 95, differential 93, shaft 97, gear train 96, and shaft 101 to cam corrector 100. Cam corrector 100 in conjunction with cam 102, and the elements just described as being driven by motor 86, are initially positioned to a value representative of K log $P_{si}$ whereas shaft 104 which rebalances transducer 21 to a signal null value is initially positioned with respect to indicated static pressure $P_{si}$. Since motor 86 is supplying power to the various elements with respect to the logarithm of indicated static pressure, a signal representative of indicated static pressure rate is supplied to amplifier 82 through a pair of connecting leads 105 and 106, and may be obtained as an output signal on a connecting lead 107.

Gear train 72 drives a differential 110 through a connecting shaft 111 to supply differential 110 with a signal proportional to the logarithm of total pressure and gear train 96 drives differential 110 through a connecting shaft 112 to initially supply a signal representative of the logarithm of indicated static pressure. Thus if the term K log $P_{si}$ is subtracted from the term K log $P_t$, an output will be obtained which is representative of the ratio of $P_t$ to $P_{si}$ and is shown as a shaft output which equals K log $R_i$, where $R_i$ equals the ratio of total pressure to indicated static pressure or $P_t$ divided by $P_{si}$. Differential 110 provides an output signal K log $R_i$ on a shaft 113 which drives a gear train 114. Gear train 114 drives a shaft 115 which is used to actuate or drive a computer 116 designated as $$1 + \frac{\Delta P_s}{P_s}$$

For certain applications computer 116 has a second input which is taken from angle of attack transducer 23 and is sent to computer 116 as a rotation of a shaft 117. This signal has been designated as K $\alpha$.

Figure 5:
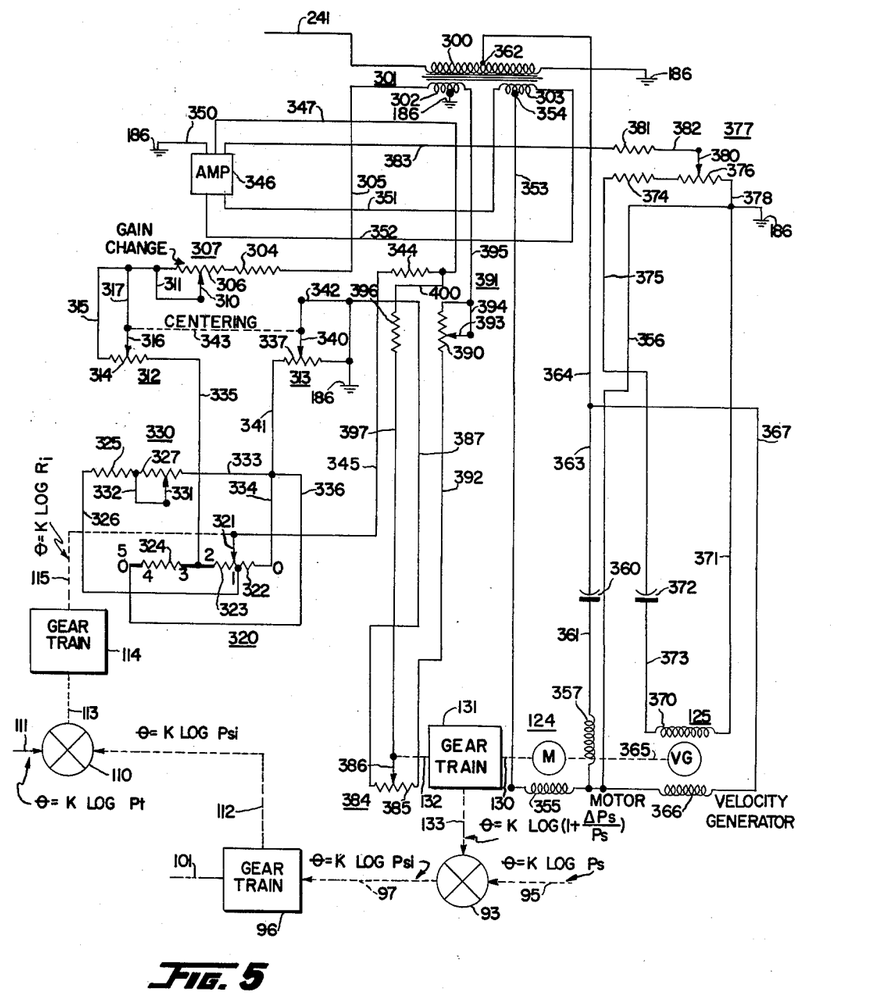
FIGURE 5 is a circuit diagram of the error correction section of the air data computer.

Computer 116 is generally made up of an electrical network which may be potentiometers arranged in a predetermined circuit. A signal of K log $(1+\Delta P_s/P_s)$ as a function of K log $R_i$ is obtained on an output lead 120. This electrical signal of $$K \log \left(1+\frac{\Delta P_s}{P_s}\right)$$

is sent to an amplifier 121 through a connecting lead 122 and connecting lead 120. A motor generator combination 123 comprises a motor 124 and a velocity generator 125 which are connected on a common shaft 365 shown in FIGURE 5. Amplifier 121 amplifies its input signal and sends it to motor 124 through a connecting lead 126. As motor 124 rotates, a rate signal is obtained from velocity generator 125 which is combined in amplifier 121 through connecting lead 122 and a connecting lead 127. As motor 124 rotates, it drives a shaft 130 which is connected to a gear train 131. Gear train 131 supplies a rotational signal output to a pair of shafts 132 and 133. A balance potentiometer 134 comprises a movable contact arm 135 and a resistive element 136. Resistive element 136 is connected to a voltage source 137 and movable contact arm 135 is mechanically connected to shaft 132. An electrical signal is received from movable contact arm 135 and sent to amplifier 121 through connecting lead 140 and connecting lead 122. This voltage may be described as a balance voltage and is of opposite phase and magnitude to the voltage supplied from computer 116. Thus motor 124 is driven to a position at which the voltage received from balance potentiometer 134 reduces the signal received from computer 116 to a null value and motor 124 stops rotating.

For purposes of illustration it may be assumed that a correction signal on shaft 133 drives through differential 93 to cause a slight movement of shaft 97 and thereby transmit through gear train 96, and shaft 101, cam corrector 100, shaft 103, cam 102, and shaft 104, a slight error signal which produces an electrical error signal in transducer 21 and thus causes motor 86 to be driven. Motor 86 in turn drives a shaft 92, gear train 91, shaft 94, and 95 to rotate the other input to differential 93 in a direction opposite to the shaft rotation of shaft 133. Thus it will be seen that the correction factor which is K log $(1+\Delta P_s/P_s)$ is subtracted from the quantity K log $P_{si}$ and this is K log $P_s$ which is the logarithm of the true value of corrected static pressure. In other words, $P_{si}=P_s+P_s$, where $\Delta P_s$ is the correction quantity. As shaft 95 is rotated due to rotation of shaft 133, the rotation being opposite to the rotation of shaft 133, the elements between differential 93 and motor 86 are driven in reverse to their original direction of rotation thus providing a value of K log $P_s$. As shaft 94 is driven to its new position, a shaft 141 is positioned to a value of K log $P_s$ and is used to drive one input to a differential 142. Differential 142 has a second input which is driven by a shaft 143 rotated by gear train 70 representing a value of K log $P_t$. A shaft 144 which is driven by the algebraic sum of the signals received on shafts 141 and 143 drives a gear train 145 to a value of K log R, where R is the ratio of total pressure $P_t$ to static pressure $P_s$. A signal in the form of a shaft rotation is obtained from gear train 145 on a shaft 146 which is K log R. Gear train 145 also drives a cam corrector 147 similar to cam corrector 74 through a connecting shaft 150 to provide an output signal of KM on a shaft 151: if the available adjustment of corrector 147 is not sufficient, an antilog cam can also be supplied here. Gear train 145 also drives a third shaft 152. A magnetic clutch 153 comprises a pair of clutch plates 154 and 155 of which 154 is connected to shaft 152. Clutch 153 has an electromagnet 156 which may be energized through a switch 157 and a suitable power source 160. Switch 157 may be controlled manually or by suitable automatic control means. When switch 157 is closed, clutch plates 154 and 155 are magnetically connected and thereafter provide an output shaft rotation on a shaft 161 which is representative of K$\Delta$ log R, defined as Mach Deviation.

Gear train 91 drives three shafts 162, 163, and 164. Shaft 162 provides an output in the form of K log $P_s$ which is a signal representative of the logarithm of the corrected static pressure. A cam corrector 165 similar to cam corrector 147 is driven by shaft 163 to give an output proportional to pressure altitude ($h$). This is supplied as an output shaft rotation by a shaft 166. A clutch 167 is shown comprising a pair of clutch plates 170 and 171 and an electromagnet 172. Clutch plate 170 is connected to shaft 164 and is rotated thereby. Electromagnet 172 may be connected to a power source 160 through a switch 173. Switch 173 may be controlled manually or automatically to cause clutch plates 170 and 171 to be magnetically connected and thereafter provide an output shaft rotation on a shaft 174 which is connected to clutch plate 171. Output shaft 174 supplies a signal of K$\Delta$log $P_s$ and is defined as Altitude Deviation.

The electrical counterpart of FIGURE 2 will now be described beginning with FIGURE 3 where total pressure $P_t$ is received in a bellows 175. A second bellows 176 is evacuated and has one end fixed at a point 177. A connecting arm 180 is connected to bellows 175 at a point opposite the inlet which receives pressure $P_t$. Another connecting arm 181 is connected to bellows 176 at a point on the side opposite the fixed point 177. Connecting arms 180 and 181 are fastened to a lever arm 182 which is supported at a fulcrum 183. Lever 182 is therefore positioned by a combination of forces exerted from evacuated bellows 176 and bellows 175, and as will be seen later, is repositioned to a balance point through shaft 80 and a spring 178.

A transformer 184 has a primary winding 185. Primary winding 185 has one end connected to ground 186 and the other end connected to a fuse 187 through a pair of connecting leads 190 and 191. Fuse 187 is connected to a switch 192. A voltage source 193 is connected to ground 186 on one end and to switch 192 on the other end by a connecting lead 194. Transformer 184 has a pair of secondary windings 195 and 196, of which secondary winding 196 is center tapped and connected to ground 186 through a connecting lead 197.

A capacitor member 200 comprises two stationary plates 201 and 202 and a common movable plate which is the extreme end of lever arm 182. Capacitor plates 201 and 202 are connected by leads 203 and 204 to the two ends of secondary winding 196 to form a bridge network. An amplifier and discriminator 205 is supplied with power from secondary winding 195 through a pair of connecting leads 206 and 207 and is connected to ground 186 by a connecting lead 208. As the total pressure signal from the total pressure source changes, bellows 175 is displaced and causes lever arm 182 to move. As lever arm 182 is moved, the capacitance is changed between plate 201 and lever arm 182 and a change in capacitance also takes place between plate 202 and lever arm 182. The bridge network becomes unbalanced due to the changes in capacitance and creates a signal of a phase and magnitude which is representative of the sense and magnitude of the change of total presure, which is sent to amplifier 205 through a connecting lead 210.

Motor 64 has an excitation winding 211 which has one end connected to ground 186 through a connecting lead 212 and has the other end connected to one side of a capacitor 213, by a connecting lead 214. Capacitor 213 has its other side connected to a tap 215 of primary winding 185 by a pair of connecting leads 216 and 217. Control winding 220 of motor 64 is connected to ground 186 through connecting lead 212 on one end and has the opposite end connected to a center tap 221 of secondary winding 195 through a connecting lead 222. As motor 64 is a two phase motor, capacitor 213 is used to shift the phase of the excitation voltage. Therefore, as a signal is received on transformer winding 195 of the discriminator portion of amplifier 205, a signal is transmitted to control winding 220 through connecting lead 222 to cause a rotation of the armature of motor 64. As motor 64 is rotated, shaft 71 is also rotated as is a common shaft 223 which drives the velocity generator armature. The excitation winding 224 of velocity generator 65 has one end connected to ground 186 through connecting lead 212 and has the other end connected to the tap 215 of transformer secondary winding 185 through a connecting lead 225 and 217. The signal winding 226 of velocity generator 65 is connected to ground 186 through a connecting lead 227 and is connected to one side of a phase shifting capacitor 230 by a connecting lead 231. The circuit is completed to ground 186 by connecting the other side of capacitor 230 to a resistor 232 through a connecting lead 233 and connecting the other end of resistor 232 to the resistive element 234 of a potentiometer 235 by a connecting lead 236 and connecting the other end of resistive element 234 to ground 186 through a connecting lead 237. As velocity generator 65 has its armature rotated, a voltage is produced on winding 226 which appears as a phase shifted signal across resistor 232 and resistive element 234. A portion of the voltage existing on resistive element 234 is picked up by movable contact arm 238 of potentiometer 235 and is sent to amplifier 205 through a connecting lead 240 to provide a rate signal or negative feedback signal used in amplifier 205 for damping any hunting of motor 64. Movable contact arm 238 is adjustable to obtain optimum operation. A connecting lead 239 is connected to the same side of capacitor 230 as connecting lead 233 to provide an output signal of $$\frac{Kd(\log P_t)}{dt}$$

between lead 239 and ground 186.

As motor 64 rotates, shaft 71 is rotated which drives gear train 79 and in turn drives shafts 73 and 143 as previously disclosed in FIGURE 2. Motion is also transferred to lever arm 182 through shaft 80 which adjusts spring 178 to position lever arm 182 at a signal null balance point of operation.

A voltage from voltage source 193 is supplied to the $P_{si}$ portion of the computer (in FIGURE 4) through a connecting lead 241. Indicated static pressure $P_{si}$ is shown entering a bellows 242. A second bellows 243 is evacuated and has one end fastened at a fixed point 244. A connecting arm 245 is connected to bellows 242 at a point opposite the inlet which receives pressure $P_{si}$. Another connecting arm 246 is connected to bellows 243 at a point on the side opposite the fixed point 244. Connecting arms 245 and 246 are fastened to a lever arm 247 which is supported at a fulcrum 250. Lever 247 is therefore positioned by a combination of forces exerted from evacuated bellows 243 and bellows 242, and as will be seen later, is repositioned to a balance point through shaft 104 and a spring 248. A transformer 251 has a primary winding 252 which has one end connected to ground 186 and the other end connected to power line 241. Transformer 251 has a pair of secondary windings 253 and 254, of which winding 253 is center tapped and connected to ground 186 through a connecting lead 255.

Figure 4:
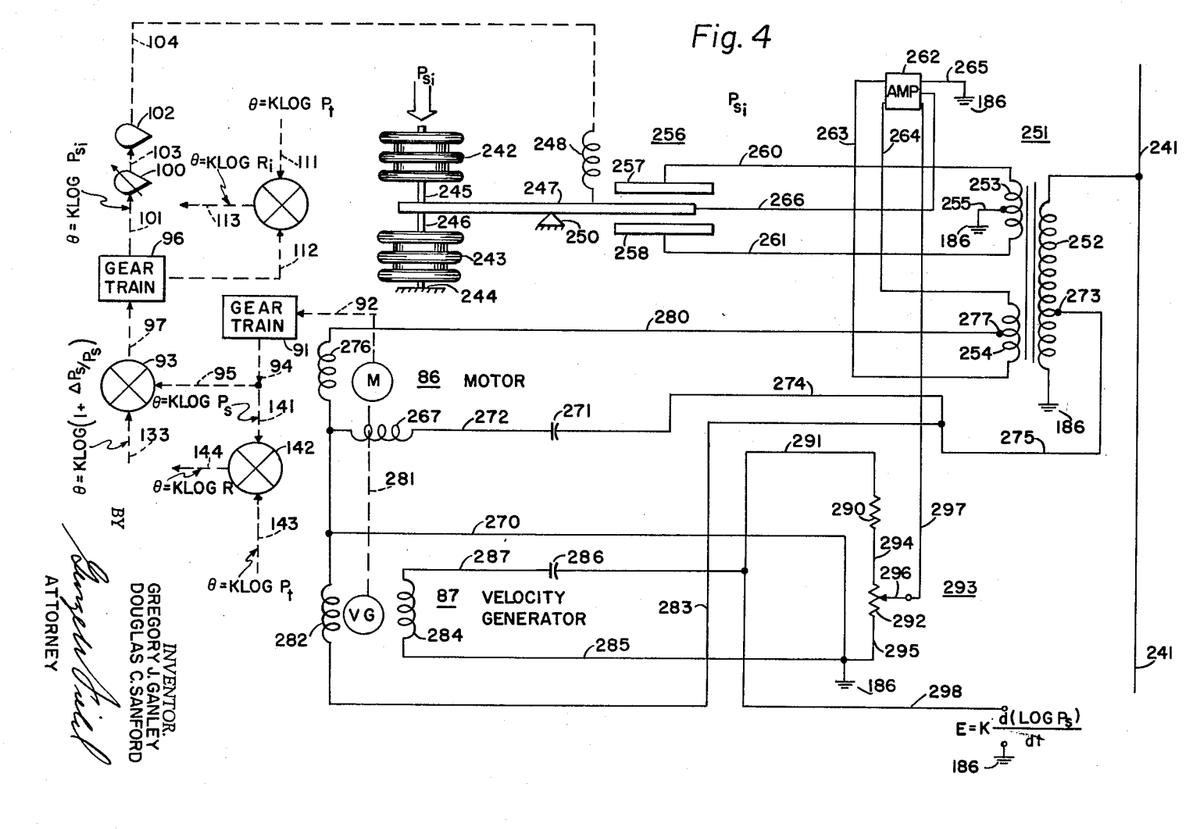
FIGURE 4 is a circuit diagram showing the static pressure section of the air data computer including the transducer.

A capacitor member 256 comprises two stationary plates 257 and 258 and a common movable plate which is the extreme end of lever arm 247. Capacitor plates 257 and 258 are connected by leads 260 and 261 to the ends of secondary winding 253 to form a bridge network. An amplifier and discriminator 262 is supplied with power from secondary winding 254 through a pair of connecting leads 263 and 264. Amplifier 262 is also connected to ground 186 through a connecting lead 265.

As the indicated static pressure is received from the pressure source, bellows 242 is displaced and causes lever arm 247 to move. As lever arm 247 is moved, the capacitance is changed between plate 257 and lever arm 247, and a change in capacitance also takes place between plate 258 and lever arm 247. The bridge network becomes unbalanced due to the changes in capacitance and creates a signal of a phase and magnitude which is representative of the sense and magnitude of the change of indicated static pressure, which is sent to amplifier 262 through a connecting lead 266.

Motor 86 has an excitation winding 267 which has one end connected to ground 186 through a connecting lead 270 and has the other end connected to one side of a capacitor 271, by a connecting lead 272. Capacitor 271 has its other side connected to a tap 273 of primary winding 252 by a pair of connecting leads 274 and 275. Control winding 276 of motor 86 is connected to ground 186 through connecting lead 270 on one end and has the opposite end connected to a center tap 277 of secondary winding 254 through a connecting lead 280. Capacitor 271 is used to shift the phase of the excitation voltage to motor 86. Therefore, as a signal is received on transformer winding 254 of the discriminator portion of amplifier 262, a signal is transmitted to control winding 276 through connecting lead 280 to cause a rotation of the armature of motor 86. As motor 86 is rotated, connecting shaft 92 is also rotated as is common shaft 281 which drives the velocity generator armature. The excitation winding 282 of velocity generator 87 has one end connected to ground 186 through connecting lead 270 and has the other end connected to the tapped point 273 of transformer winding 252 through a connecting lead 283 and connecting lead 275. The signal winding 284 of velocity generator 87 has one side connected to ground 186 through a connecting lead 285 and has the other side connected to a phase shifting capacitor 286 by a connecting lead 287. The circuit is completed to ground 186 by connecting the other side of capacitor 286 to a resistor 290 through a connecting lead 291 and connecting the other end of resistor 290 to the resistive element 292 of a potentiometer 293 by a connecting lead 294, and connecting the other end of resistive element 292 to ground 186 through a connecting lead 295. As velocity generator 87 has its armature rotated, the voltage produced on winding 284 appears as a signal across resistor 290 and resistive element 292. A portion of the voltage existing on resistive element 292 is picked off by movable contact arm 296 of potentiometer 293 and is sent to amplifier 262 through a connecting lead 297, to provide a rate signal or negative feedback signal used in amplifier 262 for damping oscillations of motor 86. Movable contact arm 296 is adjustable to obtain optimum operation. A connecting lead 298 is connected to the same side of capacitor 286 as connecting lead 291 to provide the output signal of $$\frac{Kd(\log P_s)}{dt}$$

between lead 239 and ground 186.

As the armature of motor 86 rotates, shaft 92 is rotated which in turn drives gear train 91 and shaft 94 and the other elements such as previously disclosed in FIGURE 2. Motion is also transferred to lever arm 247 through shaft 104 which adjusts spring 248 to position lever arm 247 at a signal null balance point of operation.

The correction computer which is shown in FIGURE 5 receives its excitation from power source 193 through connecting lead 241 which is connected to one end of the primary winding 300 of a transformer 301 having the other end connected to ground 186. Transformer 301 has a pair of secondary windings 302 and 303 of which 302 is center tapped and connected to ground 186.

Figure 6:
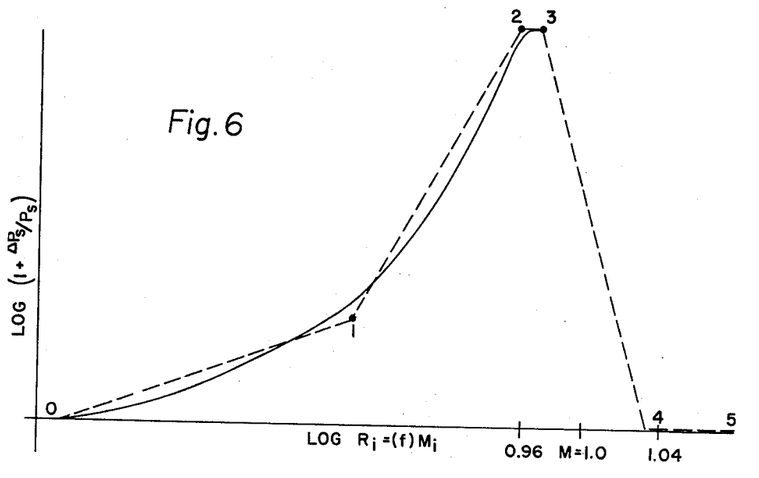
FIGURE 6 is a curve showing the relationship between the true values and the simulated values used in the computer for the correction quantity plotted as a function of the logarithm of the ratio of total pressure to indicated static pressure.

A resistor 304 is connected to one end of transformer winding 302 by a connecting lead 305 and the other end of resistor 304 is connected to a resistive element 306 of a variable resistor 307. Variable resistor 307 has a movable contact arm 310 which is connected to one end of resistive element 306, opposite the end connected to resistor 304, by a connecting lead 311. A pair of variable resistors 312 and 313 comprise a voltage centering control. Variable resistor 312 has a resistive element 314 which has one end connected to connecting lead 311, by a connecting lead 315, and a movable contact arm 316 which is likewise connected to connecting lead 311 by a connecting lead 317. A potentiometer 320 is characterized to approximate a curve such as shown in FIGURE 6, a more detailed description of which will be given later. Potentiometer 320 has a movable contact arm 321 and resistive elements 322, 323, and 324. Resistive element 322 has one end connected to a resistor 325 by a connecting lead 326. The opposite end of resistor 325 is connected to the resistive element 327 of a variable resistor 330. Variable resistor 330 also has a movable contact arm 331 which is connected to the junction of resistor 325 and resistive element 327, by a connecting lead 332. The other end of resistive element 327 is connected to resistive element 322, at the end opposite the connection of lead 326, by connecting leads 333 and 334. Thus resistive element 322 has a resistor 325 and variable resistor 330 which are in series with each other, connected in parallel with element 322. Resistive element 323 of potentiometer 320 is connected at the junction point of connecting lead 326 and resistive element 322. For this particular application, the resistance of element 323 will be higher than the combination measured betwen points zero and one as shown on FIGURE 5. The opposite end of resistive element 323 is connected to a silvered portion of the potentiometer winding and is connected to resistive element 314, on the end opposite connecting lead 315, by a connecting lead 335. Windings 323 and 324 have silvered portions extending between points 2 and 3 in FIGURE 5 which electrically connect resistive elements 323 and 324. On the end of resistive element 324 opposite connecting lead 335, another silvered portion appears between numbers 4 and 5. A connecting lead 336 joins the silvered portion of resistive element 324 just described, to connecting lead 334.

Variable resistor 313 comprises a resistive element 337 and a movable contact arm 340: resistive element 337 has one end connected to ground 186, and the other end connected to the junction point of connecting leads 334, 336, and 333, by a connecting lead 341. Movable contact arm 340 is also connected to ground 186 by a connecting lead 342.

Movable contact arm 321 of potentiometer 320 is positioned by shaft 115 which is driven by gear train 114. Gear train 114 is driven from differential 110 by connecting shaft 113 and as the inputs to differential 110 are $K \log P_t$ and $K \log P_{si}$, movable contact arm 321 is positioned to a value of $K \log R_i$, where $R_i = P_t/P_{si}$. An electrical signal is picked off on movable contact arm 321 and is sent to one end of a summing resistor 344 by a connecting lead 345. The other end of resistor 344 is connected to the input of an amplifier and discriminator 346 through a connecting lead 347. Amplifier 346 is connected to ground 186 through a connecting lead 350. Excitation is furnished to the discriminator portion of amplifier 346 from transformer secondary 303 by a pair of connecting leads 351 and 352. The signal received on connecting lead 347 is amplified by amplifier 346 and emerges as an output signal on a connecting lead 353 which is connected to a center tapped point 354 of secondary winding 303. The signal on connecting lead 353 is connected to one end of the control winding 355 of motor 124. The other end of control winding 355 is connected to ground 186 through a connecting lead 356. Excitation is supplied to the excitation winding 357 of motor 124 by connecting one end of excitation winding 357 to ground 186 through connecting lead 356 and connecting the other end of excitation winding 357 to a capacitor 360 by a connecting lead 361. The other end of capacitor 360 is connected to a tap 362 on winding 300 by a pair of connecting leads 363 and 364. As motor 124 and velocity generator 125 are connected by common shaft 365 the armature of velocity generator 125 is also rotated. The excitation winding 366 of velocity generator 125 has one end connected to ground 186 through connecting lead 356 and has the other end connected to tap 362 by connecting leads 364 and 367 to provide excitation therefor. The signal winding 370 of velocity generator 125 has one end connected to ground 186 by a connecting lead 371 and has its other end connected to a capacitor 372 by a connecting lead 373. Capacitor 372 has the other end connected to a resistor 374 by a connecting lead 375. The other end of resistor 374 is connected to the resistive portion 376 of a potentiometer 377. The other end of resistive portion 376 is connected to ground 186 by a connecting lead 378. The movable contact arm 380 of potentiometer 377 is connected to one end of a resistor 381 by a connecting lead 382. The other end of resistor 381 is connected to the input of amplifier 346 by a connecting lead 383. Potentiometer 377 may be adjusted manually to determine the proper gain setting for optimum feedback to amplifier 346 to prevent oscillations of motor 124.

A signal received from potentiometer 320 and a signal received from velocity generator 125 are combined in amplifier 346 to cause motor 124 to rotate, and a balance signal is required of equal magnitude and opposite phase to cause motor 124 to drive to a position of $$K \log \left(1 + \frac{\Delta P_s}{P_s}\right)$$

This balance signal is provided by a potentiometer 384 comprising a resistive element 385 and a movable contact arm 386. Resistive element 385 has one end connected to ground 186 by a connecting lead 387. The other end of resistive element 385 is connected to one end of the resistive element 390 of a variable resistor 391, by a connecting lead 392. Variable resistor 391 also has a movable contact arm 393 which is connected to the other end of resistive element 390 by a connecting lead 394. Movable contact arm 393 is connected to secondary 382 on the side opposite the end connected to connecting lead 385, by a connecting lead 395. Thus potentiometer 384 is supplied with an excitation voltage which may be adjusted for the proper magnitude by variable resistor 391 which is generally referred to as a gain control. Movable contact arm 386 is electrically connected to one end of a summing resistor 396 by a connecting lead 397 and the other end of resistor 396 is connected to amplifier 346 by connecting leads 347 and 400. To make certain that the voltage range appearing on resistive element 385 is in the center of the voltage range appearing on the resistive elements of potentiometer 320, movable contact arms 316 and 340, of potentiometers 312 and 313 respectively, are mechanically coupled together for adjustment by a common shaft 343 which may be adjusted in opposite directions manually or automatically to shift the voltage range obtained on movable contact arm 321. As motor 124 receives a signal, output shaft 130 is rotated and movable contact arm 386 is driven through gear train 131 and shaft 132. Simultaneously, shaft 133 is rotated from gear train 131 to a value of $$K \log\left(1+\frac{\Delta P_s}{P_s}\right)$$

which is algebraically summed with the signal $K \log P_s$ received on shaft 95 as shown in FIGURE 2.

Amplifiers 60, 82, 121, 205, 262, and 364 may be any type which has at least one stage of amplification and is connected to a discriminator at the output stage so that a two phase motor may be driven by the signals from the amplifier. One such possible amplifier and discriminator is disclosed in the Robert R. Chapman Patent 2,547,621 assigned to the same assignee as our invention.

*Operation*

Assuming that the air data computer has been receiving signals representative of total pressure $P_t$ and indicated static pressure $P_{si}$, the operation of the system will now be described in more detail. For purposes of clarity, the signal which is generally sent to amplifier 121 (FIGURE 2) will be assumed to be present on connecting lead 120 but not connected to amplifier 121 at this time. Under normal operating conditions the motors may be considered to be rotating simultaneously and the above variation will make clearer the operation of the system. Transducer 20 receives a different input signal of $P_t$ which is transmitted as an electrical signal $K\Delta P_t$ to amplifier 60. The signal is amplified and sent to motor 64, whose armature is rotated and thereby rotates gear train 70, connecting shaft 143, shaft 73, gear train 72, shaft 111, shaft 75, cam corrector 74, shaft 77, and cam 76. Cam 76 then null balances transducer 20 through shaft 80. It will be noted that shaft 80 is positioned according to total pressure while shaft 75 is positioned according to the logarithm of total pressure, thus the elements driven by motor 64 are all driven to a value representative of the logarithm of total pressure whereas the transducer is positioned to a null point or is rebalanced to a value representative of total pressure. Once the transducer is balanced, motor 64 ceases to drive and assumes a rest position. During the operation of motor 64, velocity generator 65 creates a rate signal which is fed to amplifier 60 and is also supplied as an output signal which is $$K\Delta \frac{d(\log P_t)}{dt}$$

In like manner, transducer 21 receives an indicated static pressure signal which is not a true value of static pressure and creates an electrical signal which is $K\, P_{si}$ which is sent to amplifier 82. Motor 86 is connected to the output of amplifier 82 to receive the amplified signals and it in turn rotates shaft 92, gear train 91, shafts 162 and 94, 141 and 95, differential 93, shaft 97, gear train 96, shafts 101 and 112, cam corrector 100, shaft 103, cam 102, and shaft 104. Since cam corrector 100 and cam 102 are interposed between motor 86 and transducer 21, the elements driven by motor 86 up to and including cam 102 are positioned to a shaft rotation of $K \log P_{si}$ whereas shaft 104 is positioned to a value of $P_{si}$ which is used to null balance transducer 21. For the present, it will be assumed that transducer 23 is not used or, that angle of attack $\alpha$ is zero. Differential 110 performs the algebraic summation of the information present on shafts 111 and 112 so that the output taken on shaft 113 is $K \log R_t$. Shaft rotation is converted to an electrical signal in computer 116 by the use of elements 320, 330, etc. that produce electrical signals which approximate certain curve characteristics.

At this point, if connecting lead 120 is connected into the circuit, a signal of $$K \log\left(1+\frac{\Delta P_s}{P_s}\right)$$

is received in amplifier 121 and causes the armature of motor 124 to rotate. Motor 124 also drives movable contact arm 135 which may be driven to a point of equal magnitude and opposite phase with respect to the signal received from computer 116. Thus, motor 124 is driven to a value indicated by the correction computer and is balanced out by a voltage of equal magnitude and opposite phase to cause the servo to remain stationary. During this period of operation differential 93 receives an input from shaft 133 and begins to drive shaft 97, gear train 96, shaft 101, cam corrector 100, shaft 103, cam 102, and shaft 104 to produce a slight error at transducer 21. Again an electrical signal is received from transducer 21 which is sent to amplifier 82 and motor 86 whereby the armature of motor 86 is driven in a direction which causes shaft 95 to rotate in an opposite direction and at the same speed to that of shaft 133. This continues until movable contact arm 135 reaches a position where the input signal to amplifier 121 reaches zero, stopping motor 124 from driving. This operation stops the rotation of shaft 133 which is the input to differential 93. Thus the output seen at shaft 97 which is connected to differential 93 is one of zero rotation.

The logarithm of static pressure $K \log P_s$ which is on shaft 95 is added to the logarithm value of the correction signal $$K \log\left(1+\frac{\Delta P_s}{P_s}\right)$$

which is on shaft 133 to produce the logarithm of indicated static pressure $K \log P_{si}$ on shaft 97 where $P_{si} = P_s + \Delta P_s$. This may be shown mathematically by letting $$K \log P_{si} = K \log P_s + K \log\left(1+\frac{\Delta P_s}{P_s}\right)$$

Therefore:

$$K \log P_{si} = K \log P_s + K \log \frac{(P_s + \Delta P_s)}{P_s}$$

$$= K \log P_s + K \log \frac{(P_{si})}{P_s}$$

$$= K \log \left[\frac{(P_s)(P_{si})}{P_s}\right]$$

$$= K \log P_{si}$$

Therefore, shaft 97 remains fixed while shaft 92, gear train 91, shafts 94, 141, and 95 are rotated as long as velocity generator 87 has one side connected to ground 186 through a connecting lead 285 and has the other side connected to a phase shifting capacitor 286 by a connecting lead 287. The circuit is completed to ground 186 by connecting the other side of capacitor 286 to a resistor 290 through a connecting lead 291 and connecting the other end of resistor 290 to the resistive element 292 of a potentiometer 293 by a connecting lead 294, and connecting the other end of resistive element 292 to ground 186 through a connecting lead 295. As velocity generator 87 has its armature rotated, the voltage produced on winding 284 appears as a signal across resistor 290 and resistive element 292. A portion of the voltage existing on resistive element 292 is picked off by movable contact arm 296 of potentiometer 293 and is sent to amplifier 262 through a connecting lead 297, to provide a rate signal or negative feedback signal used in amplifier 262 for damping oscillations of motor 86. Movable contact arm 296 is adjustable to obtain optimum operation. A connecting lead 298 is connected to the same side of capacitor 286 as connecting lead 291 to provide the output signal of $$\frac{K d(\log P_s)}{dt}$$

between lead 239 and ground 186.

As the armature of motor 86 rotates, shaft 92 is rotated which in turn drives gear train 91 and shaft 94 and the other elements such as previously disclosed in FIGURE 2. Motion is also transferred to lever arm 247 through shaft 104 which adjusts spring 248 to position lever arm 247 at a signal null balance point of operation.

The correction computer which is shown in FIGURE 5 receives its excitation from power source 193 through connecting lead 241 which is connected to one end of the primary winding 300 of a transformer 301 having the other end connected to ground 186. Transformer 301 has a pair of secondary windings 302 and 303 of which 302 is center tapped and connected to ground 186.

A resistor 304 is connected to one end of transformer winding 302 by a connecting lead 305 and the other end of resistor 304 is connected to a resistive element 306 of a variable resistor 307. Variable resistor 307 has a movable contact arm 310 which is connected to one end of resistive element 306, opposite the end connected to resistor 304, by a connecting lead 311. A pair of variable resistors 312 and 313 comprise a voltage centering control. Variable resistor 312 has a resistive element 314 which has one end connected to connecting lead 311, by a connecting lead 315, and a movable contact arm 316 which is likewise connected to connecting lead 311 by a connecting lead 317. A potentiometer 320 is characterized to approximate a curve such as shown in FIGURE 6, a more detailed description of which will be given later. Potentiometer 320 has a movable contact arm 321 and resistive elements 322, 323, and 324. Resistive element 322 has one end connected to a resistor 325 by a connecting lead 326. The opposite end of resistor 325 is connected to the resistive element 327 of a variable resistor 330. Variable resistor 330 also has a movable contact arm 331 which is connected to the junction of resistor 325 and resistive element 327, by a connecting lead 332. The other end of resistive element 327 is connected to resistive element 322, at the end opposite the connection of lead 326, by connecting leads 333 and 334. Thus resistive element 322 has a resistor 325 and variable resistor 330 which are in series with each other, connected in parallel with element 322. Resistive element 323 of potentiometer 320 is connected at the junction point of connecting lead 326 and resistive element 322. For this particular application, the resistance of element 323 will be higher than the combination measured betwen points zero and one as shown on FIGURE 5. The opposite end of resistive element 323 is connected to a silvered portion of the potentiometer winding and is connected to resistive element 314, on the end opposite connecting lead 315, by a connecting lead 335. Windings 323 and 324 have silvered portions extending between points 2 and 3 in FIGURE 5 which electrically connect resistive elements 323 and 324. On the end of resistive element 324 opposite connecting lead 335, another silvered portion appears between numbers 4 and 5. A connecting lead 336 joins the silvered portion of resistive element 324 just described, to connecting lead 334.

Variable resistor 313 comprises a resistive element 337 and a movable contact arm 340: resistive element 337 has one end connected to ground 186, and the other end connected to the junction point of connecting leads 334, 336, and 333, by a connecting lead 341. Movable contact arm 340 is also connected to ground 186 by a connecting lead 342.

Movable contact arm 321 of potentiometer 320 is positioned by shaft 115 which is driven by gear train 114. Gear train 114 is driven from differential 110 by connecting shaft 113 and as the inputs to differential 110 are $K \log P_t$ and $K \log P_{si}$, movable contact arm 321 is positioned to a value of $K \log R_i$, where $R_i = P_t/P_{si}$. An electrical signal is picked off on movable contact arm 321 and is sent to one end of a summing resistor 344 by a connecting lead 345. The other end of resistor 344 is connected to the input of an amplifier and discriminator 346 through a connecting lead 347. Amplifier 346 is connected to ground 186 through a connecting lead 350. Excitation is furnished to the discriminator portion of amplifier 346 from transformer secondary 303 by a pair of connecting leads 351 and 352. The signal received on connecting lead 347 is amplified by amplifier 346 and emerges as an output signal on a connecting lead 353 which is connected to a center tapped point 354 of secondary winding 303. The signal on connecting lead 353 is connected to one end of the control winding 355 of motor 124. The other end of control winding 355 is connected to ground 186 through a connecting lead 356. Excitation is supplied to the excitation winding 357 of motor 124 by connecting one end of excitation winding 357 to ground 186 through connecting lead 356 and connecting the other end of excitation winding 357 to a capacitor 360 by a connecting lead 361. The other end of capacitor 360 is connected to a tap 362 on winding 300 by a pair of connecting leads 363 and 364. As motor 124 and velocity generator 125 are connected by common shaft 365 the armature of velocity generator 125 is also rotated. The excitation winding 366 of velocity generator 125 has one end connected to ground 186 through connecting lead 356 and has the other end connected to tap 362 by connecting leads 364 and 367 to provide excitation therefor. The signal winding 370 of velocity generator 125 has one end connected to ground 186 by a connecting lead 371 and has its other end connected to a capacitor 372 by a connecting lead 373. Capacitor 372 has the other end connected to a resistor 374 by a connecting lead 375. The other end of resistor 374 is connected to the resistive portion 376 of a potentiometer 377. The other end of resistive portion 376 is connected to ground 186 by a connecting lead 378. The movable contact arm 380 of potentiometer 377 is connected to one end of a resistor 381 by a connecting lead 382. The other end of resistor 381 is connected to the input of amplifier 346 by a connecting lead 383. Potentiometer 377 may be adjusted manually to determine the proper gain setting for optimum feedback to amplifier 346 to prevent oscillations of motor 124.

A signal received from potentiometer 320 and a signal received from velocity generator 125 are combined in amplifier 346 to cause motor 124 to rotate, and a balance signal is required of equal magnitude and opposite phase to cause motor 124 to drive to a position of $$K \log \left(1 + \frac{\Delta P_s}{P_s}\right)$$

This balance signal is provided by a potentiometer 384 comprising a resistive element 385 and a movable contact arm 386. Resistive element 385 has one end connected to ground 186 by a connecting lead 387. The other end of resistive element 385 is connected to one end of the resistive element 390 of a variable resistor 391, by a connecting lead 392. Variable resistor 391 also has a movable contact arm 393 which is connected to the other end of resistive element 390 by a connecting lead 394. Movable contact arm 393 is connected to secondary 302 on the side opposite the end connected to connecting lead 305, by a connecting lead 395. Thus potentiometer 384 is supplied with an excitation voltage which may be adjusted for the proper magnitude by variable resistor 391 which is generally referred to as a gain control. Movable contact arm 386 is electrically connected to one end of a summing resistor 396 by a connecting lead 397 and the other end of resistor 396 is connected to amplifier 346 by connecting leads 347 and 400. To make certain that the voltage range appearing on resistive element 385 is in the center of the voltage range appearing on the resistive elements of potentiometer 320, movable contact arms 316 and 340, of potentiometers 312 and 313 respectively, are mechanically coupled together for adjustment by a common shaft 343 which may be adjusted in opposite directions manually or automatically to shift the voltage range obtained on movable contact arm 321. As motor 124 receives a signal, output shaft 130 is rotated and movable contact arm 386 is driven through gear train 131 and shaft 132. Simultaneously, shaft 133 is rotated from gear train 131 to a value of $$K \log \left(1+\frac{\Delta P_s}{P_s}\right)$$

which is algebraically summed with the signal K log $P_s$ received on shaft 95 as shown in FIGURE 2.

Amplifiers 60, 82, 121, 205, 262, and 364 may be any type which has at least one stage of amplification and is connected to a discriminator at the output stage so that a two phase motor may be driven by the signals from the amplifier. One such possible amplifier and discriminator is disclosed in the Robert R. Chapman Patent 2,547,621 assigned to the same assignee as our invention.

*Operation*

Assuming that the air data computer has been receiving signals representative of total pressure $P_t$ and indicated static pressure $P_{si}$, the operation of the system will now be described in more detail. For purposes of clarity, the signal which is generally sent to amplifier 121 (FIGURE 2) will be assumed to be present on connecting lead 120 but not connected to amplifier 121 at this time. Under normal operating conditions the motors may be considered to be rotating simultaneously and the above variation will make clearer the operation of the system. Transducer 20 receives a different input signal of $P_t$ which is transmitted as an electrical signal $K\Delta P_t$ to amplifier 60. The signal is amplified and sent to motor 64, whose armature is rotated and thereby rotates gear train 70, connecting shaft 143, shaft 73, gear train 72, shaft 111, shaft 75, cam corrector 74, shaft 77, and cam 76. Cam 76 then null balances transducer 20 through shaft 80. It will be noted that shaft 80 is positioned according to total pressure while shaft 75 is positioned according to the logarithm of total pressure, thus the elements driven by motor 64 are all driven to a value representative of the logarithm of total pressure whereas the transducer is positioned to a null point or is rebalanced to a value representative of total pressure. Once the transducer is balanced, motor 64 ceases to drive and assumes a rest position. During the operation of motor 64, velocity generator 65 creates a rate signal which is fed to amplifier 60 and is also supplied as an output signal which is $$K\Delta \frac{d(\log P_t)}{dt}$$

In like manner, transducer 21 receives an indicated static pressure signal which is not a true value of static pressure and creates an electrical signal which is K $P_{si}$ which is sent to amplifier 82. Motor 86 is connected to the output of amplifier 82 to receive the amplified signals and it in turn rotates shaft 92, gear train 91, shafts 162 and 94, 141 and 95, differential 93, shaft 97, gear train 96, shafts 101 and 112, cam corrector 100, shaft 103, cam 102, and shaft 104. Since cam corrector 100 and cam 102 are interposed between motor 86 and transducer 21, the elements driven by motor 86 up to and including cam 102 are positioned to a shaft rotation of K log $P_{si}$ whereas shaft 104 is positioned to a value of $P_{si}$ which is used to null balance transducer 21. For the present, it will be assumed that transducer 23 is not used or, that angle of attack α is zero. Differential 110 performs the algebraic summation of the information present on shafts 111 and 112 so that the output taken on shaft 113 is K log $R_i$. Shaft rotation is converted to an electrical signal in computer 116 by the use of elements 320, 330, etc. that produce electrical signals which approximate certain curve characteristics.

At this point, if connecting lead 120 is connected into the circuit, a signal of $$K \log \left(1+\frac{\Delta P_s}{P_s}\right)$$

is received in amplifier 121 and causes the armature of motor 124 to rotate. Motor 124 also drives movable contact arm 135 which may be driven to a point of equal magnitude and opposite phase with respect to the signal received from computer 116. Thus, motor 124 is driven to a value indicated by the correction computer and is balanced out by a voltage of equal magnitude and opposite phase to cause the servo to remain stationary. During this period of operation differential 93 receives an input from shaft 133 and begins to drive shaft 97, gear train 96, shaft 101, cam corrector 100, shaft 103, cam 102, and shaft 104 to produce a slight error at transducer 21. Again an electrical signal is received from transducer 21 which is sent to amplifier 82 and motor 86 whereby the armature of motor 86 is driven in a direction which causes shaft 95 to rotate in an opposite direction and at the same speed to that of shaft 133. This continues until movable contact arm 135 reaches a position where the input signal to amplifier 121 reaches zero, stopping motor 124 from driving. This operation stops the rotation of shaft 133 which is the input to differential 93. Thus the output seen at shaft 97 which is connected to differential 93 is one of zero rotation.

The logarithm of static pressure K log $P_s$ which is on shaft 95 is added to the logarithm value of the correction signal $$K \log \left(1+\frac{\Delta P_s}{P_s}\right)$$

which is on shaft 133 to produce the logarithm of indicated static pressure K log $P_{si}$ on shaft 97 where $P_{si}=P_s+\Delta P_s$. This may be shown mathematically by letting $$K \log P_{si} = K \log P_s + K \log \left(1+\frac{\Delta P_s}{P_s}\right)$$

Therefore:

$$K \log P_{si} = K \log P_s + K \log \frac{(P_s+\Delta P_s)}{P_s}$$

$$= K \log P_s + K \log \frac{(P_{si})}{P_s}$$

$$= K \log \left[\frac{(P_s)(P_{si})}{P_s}\right]$$

$$= K \log P_{si}$$

Therefore, shaft 97 remains fixed while shaft 92, gear train 91, shafts 94, 141, and 95 are rotated as long as shaft 133 continues to rotate. Once the correction computer 116 assumes a null balance, and the slight error introduced in transducer 21 is nullified, motor 86 ceases to rotate and shaft 141 now remains at a position of K log $P_s$.

Differential 142 receives the shaft rotations of K log $P_s$ and K log $P_t$ and by subtracting the logarithm quantities, a signal of K log R is the output of differential 142. The ratio R may be used to compute Mach number KM through the use of gear train 145, shaft 150 and cam corrector 147 and is also presented as an output signal of K log R on a shaft 146. Since it is also desirable to detect a Mach number deviation from a predetermined Mach number, clutch 153 which is driven by gear train 145 may be energized by closing switch 157 to cause clutch plates 154 and 155 to be connected and thereafter provide on shaft 161 an output of $K\Delta$ log R which is representative of Mach deviation.

Returning to gear train 91, shaft 162 presents an output which is K log $P_s$ and also drives cam corrector 165 to produce an output signal K$h$ which is representative of pressure altitude $h$. It is also desirable in certain cases to have a signal representative of altitude deviation and this is accomplished by the use of clutch 167 which is driven by shaft 164 and is energized by switch 173 to cause clutch plates 170 and 171 to be magnetically connected together and drive output shaft 174 which has a signal of $K\Delta$ log $P_s$ present which is representative of Altitude Deviation. A signal which is representative of altitude rate is also obtainable in the form of a first derivative of $P_s$ which is obtainable electrically on output 107 and is $$K \frac{d(\log P_s)}{dt}$$

Figure 3:
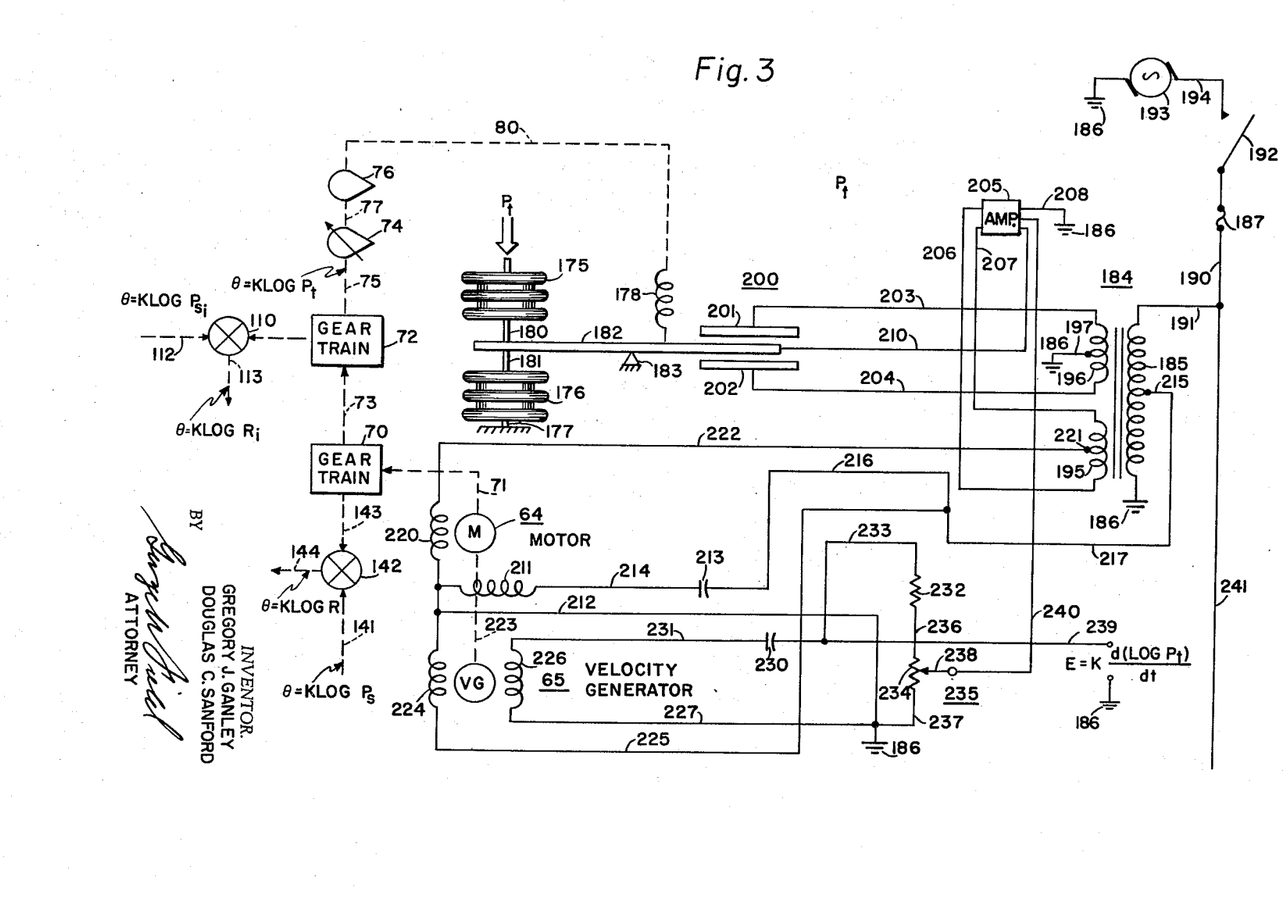
FIGURE 3 is a circuit diagram showing the total pressure section of the air data computer including the transducer.

Turning now to the electrical counterpart and starting with FIGURE 3 it will be seen that total pressure $P_t$ is received in bellows 175 which causes a movement against reference bellows 176 to move lever arm 182 and thereby vary the capacitances between the end of lever arm 182 and plates 201 and 202. A signal representative of a $P_t$ signal is then obtained at amplifier 205 where the signal is amplified and an unbalance signal then appears on connecting lead 222 from transformer secondary winding 195 and this signal is used to energize control winding 220 of motor 64. Since motor 64 has excitation winding 211 connected to transformer primary winding 185, the armature of motor 64 is rotated and shaft 71 is rotated as well as a common shaft 223 which connects the armature of motor 64 to the armature of velocity generator 65. Velocity generator 65 has excitation winding 224 excited from a tapped winding of primary winding 185 and signal winding 226 provides a signal representative of rate which is used as a damping signal to prevent oscillations of motor 64. As shaft 71 is rotated lever arm 182 is positioned through shaft 80 and spring 178 to a balance point between capacitor plates 201 and 202 to cause the $P_t$ motor 64 to be driven to a rest position. The main function of the $P_t$ transducer is to supply signals of K log $P_t$ to differential 110 and differential 142.

Static pressure $P_{s1}$ is sent to bellows 242 in FIGURE 4 which works against bellows 243 to move lever arm 247 and thereby unbalance the bridge circuit formed by capacitor member 256 and the center tapped secondary winding 253. As a signal is detected on lever arm 247, it is amplified at amplifier 262 and appears as an output across transformer winding 254. Motor 86 receives the amplified signal on control winding 276, and since winding 267 is connected to a tap on primary winding 252, the armature of motor 86 is rotated in a direction dictated by capacitor member 256. Motor 86 causes shafts 92 and 281 to be rotated and thus velocity generator 87 is likewise rotated. The signal output of velocity generator 87 is detected across resistive element 292 of potentiometer 293. Movable contact arm 296, which is adjustable, is also electrically connected to amplifier 262 to give a negative feedback signal and thereby prevent oscillations of motor 86. The main function of the $P_{s1}$ transducer is to supply signals of K log $P_{s1}$ to differentials 110 and 93.

The correction signal portion of the air data computer is shown in greater detail in FIGURE 5 and its operation will now be described. Excitation for transformer 301 as well as transformers 251 and 184 which were previously described is received from voltage source 193. Voltage is received on primary winding 300 which provides excitation in secondary winding 302 so that a current path may be traced from secondary winding 302 through gain change variable resistor 307, and centering variable resistor 312, the silvered portion of potentiometer 320, designated between points 2 and 3, and is returned to the center tap of winding 302, which is grounded, through resistive elements 324 or 323 and 322 which are connected through range variable resistor 313 to ground. It will be remembered that differential 110 has an output signal which is K log $R_1$ and this signal emerges from gear train 114 as a shaft rotation of shaft 115 to position movable contact arm 321. Referring to FIGURE 6, log $R_1$ is equivalent to a function of indicated Mach number $M_i$ and this is plotted as the solid line against a $$\text{Log}\left(1+\frac{\Delta P_s}{P_s}\right)$$

An approximation of the solid curve, which is the true value taken from data of dynamic tests, is made by the dashed curve portions which are designated 0, 1, 2, 3, 4, and 5. Potentiometer 320 has its resistive elements connected so that the resistance picked off between movable contact arm 321 and ground 186 equals the values represented by the dashed curve.

Assuming the aircraft is starting from a low speed or zero speed, movable contact arm 321 would move successively from zero to point 1 and along the dashed line on FIGURE 6, from zero to point 1. As movable contact arm 321 (FIGURE 5) reaches the junction of resistive elements 322 and 323, resistive element 323 is added to the resistance of 322 but has in parallel a resistor 325 and a variable resistor 330. This causes the slope of the resistance curve to steepen such as seen from point 1 to point 2 in FIGURE 6. The plateau portion of the curve in FIGURE 6 from point 2 to 3 is produced by the silvered portion of the resistance winding of potentiometer 320 and the slope from point 3 to 4 is simulated by resistive element 324 of potentiometer 320. The silvered portion of resistive element 324 produces the zero value from point 4 to point 5, at a value of Mach number above 1. The silvered portion or plateau from point 2 to 3 is purposely chosen to extend into the indeterminate area of the actual curve so that instability will not occur in the computer and point 4 is also in the indeterminate area to aid in maintaining stability in the system. The signal detected on movable contact arm 321 is sent to amplifier 346 and the output of amplifier 346 is used to energize control winding 355 of motor 124. As the armature of motor 124 rotates, it turns shaft 130 and shaft 365. Shaft 365 couples the armature of velocity generator 125 to motor 124 and since excitation winding 366 is excited by voltage from transformer winding 300, signal winding 370 of velocity generator 125 presents a signal which appears across resistive element 376 of potentiometer 377. This rate signal or velocity feedback signal is detected on movable contact arm 380 and sent to amplifier 346 to prevent oscillations of motor 124. In order to null balance the signal, potentiometer 384 has its movable contact arm driven to a position so that a voltage which is dropped across resistive element 385 is used to balance the voltage obtained on movable contact arm 321 and thus to present a zero signal to amplifier 346. Balance potentiometer 384 supplies a voltage of opposite sense or phase which may be driven to a value of equal magnitude obtained on movable contact arm 321. The output from motor 124, besides driving movable contact arm 386, drives differential 93 where it is alegbraically summed with the shaft rotation of shaft 95. As was explained in the operation of the disclosure shown in FIGURE 2, output shaft 97 remains relatively fixed and shaft 95 is rotated in a direction opposite to that of shaft 133 so that shaft 97 maintains its relatively fixed position of K log $P_{st}$.

It becomes a rather simple matter to derive the other quantities which would generally be used as outputs from an air data computer and these have not been shown in the more detailed electrical schematic.

It will be remembered that for certain applications transducer 23 is connected to the correction computer 116. In FIGURE 2 a mechanical connection is shown as shaft 117 which also appears on FIGURE 7, as does shaft 115 driven by the function K log $R_i$.

Figure 7:
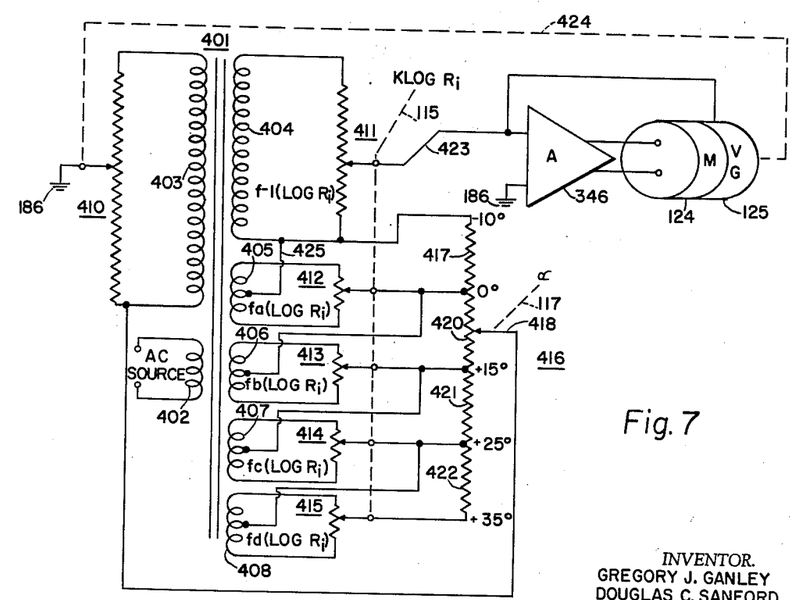
FIGURE 7 is a circuit diagram showing the error corrector section of the air data computer which would be used where the angle of attack also effects the error correction signal.

FIGURE 7 is a representative of a configuration that would be utilized where static pressure correction is necessary as a function of angle of attack α. A transformer 401 has a primary winding 402 and six secondary windings 403, 404, 405, 406, 407, and 408. A potentiometer 410 has its resistive element connected to secondary winding 403 and a movable connection arm connected to ground 186. Secondary winding 404 is connected to the resistive element of a potentiometer 411 and secondary winding 405 is connected to the resistive element of a potentiometer 412. Secondary windings 406, 407, and 408 are connected to the resistive windings of three potentiometers 413, 414, and 415 respectively. A potentiometer 416 has a movable contact arm 418 which is driven by shaft 117, representative of angle of attack. Potentiometer 416 also contains four resistive elements 417, 420, 421, and 422. Resistive element 417 electrically represents an angle of attack from −10 to 0 degrees, resistive element 420 represents an angle of attack from 0 to +15 degrees, whereas resistive element 421 represents an angle of attack from 15 to 25 degrees, and resistive element 422 represents an angle of attack from 25 degrees to 35 degrees. Assuming that the angle of attack is −10 degrees, movable contact arm 418 will be at the −10 degree position of resistive element 417 thereby excluding any signals which could be detected from potentiometers 412, 413, 414, and 415. Thus the only signal detected is from the resistive element of potentiometer 411, and any unbalance created in the resistive element of potentiometer 410. This signal is sent to amplifier 346 through a connecting lead 423. Amplifier 346 is also connected to ground 186 to complete the circuit and the signal is amplified in amplifier 346 and sent to motor 124 which has its armature rotated and thereby rotates a shaft 424 to rebalance a network comprising potentiometers 410 and 411 in conjunction with transformer 401. As the angle of attack changes from −10 degrees to 0 degrees, a signal developed on resistive element 417 of potentiometer 416 is picked off at the 0 degree point since transformer winding 404 is connected to a center tap on secondary winding 405 by a connecting lead 425. As the angle of attack α increases, it will be noted that the voltages are added in series to the values existing on resistive elements 417 and 411 since the movable contact arm of potentiometer 412 is connected to the zero point of resistive element 417 and the zero point of element 417 is connected to the center tap on secondary winding 406. In like manner, the movable contact arm of potentiometer 413 is connected to the +15 degree point of resistive element 420 which is also connected to the center tap of transformer secondary 407. The movable contact arm of potentiometer 414 is connected to the +25 degree point of resistive element 421 and is also connected to the center tap of secondary winding 408. To complete the circuit, a movable contact arm of potentiometer 415 is connected to the +35 degree point of resistive element 422. Thus it may be seen that as the ratio $R_i$ changes, a K log $R_i$ signal on shaft 115 changes the movable contact arms of potentiometers 411, 412, 413, 414, and 415. If the angle of attack changes, movable contact arm 418 is then positioned by shaft 117 along the appropriate points of resistive elements 417, 420, 421, or 422.

Figure 8:
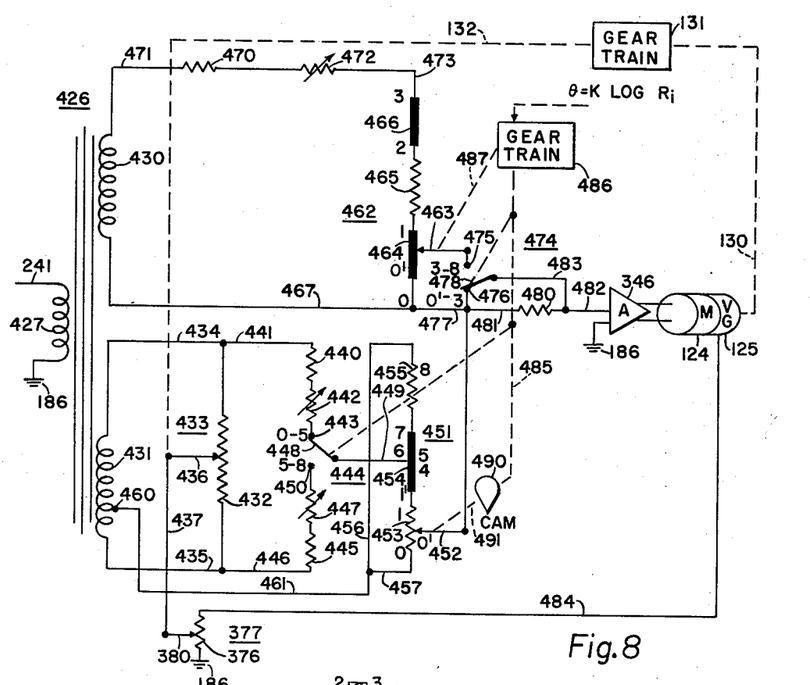
FIGURE 8 is a circuit diagram of the correction computer section of the air data computer utilizing switches for changing the correction value during a discontinuous portion of the signal.

Another possible means of mechanization of a static error corrector is disclosed in an electrical schematic of FIGURE 8. A numbering sequence of the curves and resistive elements has been adopted in FIGURE 9 which is similar to that shown in FIGURES 5 and 6 to describe more simply the solution to the problem. FIGURE 8 shows a transformer 426 comprising a primary winding 427 and a pair of secondary windings 430 and 431. Primary winding 427 is connected to ground 186 on one end and to a source of power through power connecting lead 241 on the other end. Secondary winding 431 is connected to one end of a resistive element 432 of a potentiometer 433 by a connecting lead 434. The other end of resistive element 432 is connected to the other end of secondary winding 431 by a connecting lead 435. Potentiometer 433 comprises a movable contact arm 436 which is connected to movable contact arm 380 of potentiometer 377 by a connecting lead 437. Potentiometer 433 will generally be known as a balance potentiometer. A resistor 440 has one end connected to one end of resistive element 432 by a connecting lead 441. The other end of resistor 440 is connected to one end of a variable resistor 442 and the other end of variable resistor 442 is connected to a contact point 443 of a switch 444. A resistor 445 is connected to the other end of resistive element 432 by a connecting lead 446 and the other end of resistor 445 is connected to a variable resistor 447. The other end of resistor 447 is connected to a contact point 450 of switch 444. Switch 444 also has a movable contact arm 448.

Another potentiometer 451 comprises a movable contact arm 452 and three resistive elements 453, 454, and 455. Resistive element 453 is connected to one end of resistive element 454 which is a silvered portion and the other end of silvered portion 454 is connected to resistive element 455. The mid center of silvered portion 454 is connected to movable contact arm 448 by a connecting lead 449. The ends of resistive elements 453 and 455, opposite silvered portion 454, are connected together by a pair of connecting leads 456 and 457. A tapped point 460, of secondary winding 431 is connected to connecting lead 457 by a connecting lead 461.

Another potentiometer 462 comprises a movable contact arm 463 and three resistive elements 464, 465, and 466. Resistive elements 464 and 466 are silvered portions of a potentiometer winding and are each connected to different ends of resistive element 465. The end of silvered portion 464 opposite resistive portion 465 is connected to secondary winding 430 by a connecting lead 467 and the other end of secondary winding 430 is connected to a resistor 470 by a conecting lead 471. Resistor 470 is connected to a variable resistor 472 which has its other end connected to the end of silvered portion 466, opposite resistive element 465, by a connecting lead 473. A switch 474 comprises a pair of contact points 475 and 476 and a movable contact arm 478. Switch contact point 475 is connected to movable contact arm 463 by a connecting lead 479. Switch contact point 476 is connected to connecting lead 467 by a connecting lead 477 and is connected to a resistor 480 by a connecting lead 481. The other end of resistor 480 is connected to amplifier 346 by a connecting lead 482 and this same end of resistor 480 is connected to movable contact arm 478 by a connecting lead 483. Amplifier 346 is connected to motor 124 and is connected to ground 186. Velocity generator 125 supplies a negative feedback signal to resistive element 376 of potentiometer 377 through a connecting lead 484. A mechanical connection is made between movable contact arm 436 and velocity generator 125, through connecting shaft 130, gear train 131 and connecting shaft 132. Movable contact arms 448 and 478 are positioned by a common shaft 485 which is driven from a gear train 486. Gear train 486 is driven by a mechanical shaft rotation of K log $R_1$. Gear train 486 drives a shaft 487 at a speed substantially higher than the shaft rotation of 485. Potentiometer 462 has resistive elements 464, 465, and 466 formed in a circular shape which encompasses approximately 359° so that movable contact arm 463 sweeps resistive elements 464, 465, and 466 approximately eighteen to twenty times for a rotational angle of approximately 300 degrees of movable contact arm 452. In other words, the only time that resistive element 465 is in the circuit is during the relatively small change in $R_1$ just preceding the indeterminate area. Resistive element 465 is swept at a fast rate because of the physical limitations of mechanical variety.

Shaft 485 rotates a cam 490 which has a shaft 491 connected to the cam follower and this shaft positions movable contact arm 452 so that the resistive elements of potentiometer 451 are actually characterized by the movement of cam 490.

Figure 9:
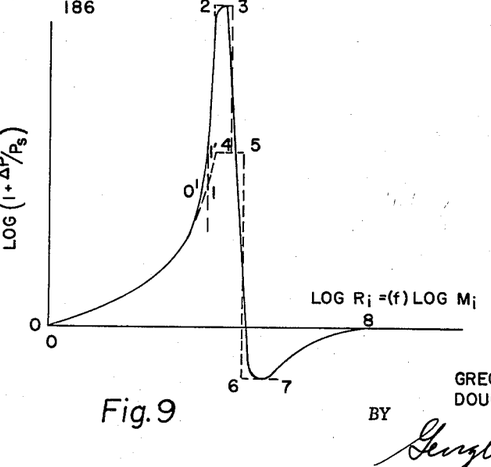
FIGURE 9 is a graphical presentation of the correction quantity vs. Log $R_i$ showing switching points for the circuit of FIGURE 8.

Assuming that an aircraft is starting from a zero velocity, the operation of the static error corrector as shown in FIGURE 8 will now be described. Initially, switch 444 has movable contact arm 448 in contact with contact point 443 and switch 474 has movable contact arm 478 in contact with contact point 476. Movable contact arm 452 is located at the zero position. As the aircraft increases its velocity, cam 490 positions movable contact arm 452 in a characterized manner such that the error is simulated by a resistance change of resistive element 453. At this point it will be noted that a balance network is formed between movable contact arms 436 and 452 since voltage is supplied to the balance network by secondary winding 431. When the velocity of the aircraft reaches a value represented by point 0' on resistive element 453, silvered portion 464 of potentiometer 462 is engaged with movable contact arm 463 from point 0' to 1. Simultaneously, movable contact arm 478 is switched from contact point 476 to 475. At point 1 resistive element 465 is brought into the circuit to be combined with resistive element 453 such that the portion of the curve from point 1 to point 2 is duplicated. After movable contact arm 452 engages silvered portion 454, the voltage present on movable contact arm 452 does not increase. Upon reaching point 2, movable contact arm 463 reaches a silvered portion 466 thereby causing the voltage to reach a plateau such as shown in FIGURE 9 between points 2 and 3. As the shaft representative of K log $R_1$ continues to drive in an increasing direction, movable contact arm 478 is changed from contact point 475 to contact point 476. It will be noted that the voltages received on movable contact arm 463 are added in series with the voltage received on movable contact arm 452 and these are sent to amplifier 346 through connecting lead 482. However, when movable contact arm 478 is switched to contact point 476, as log $R_1$ reaches point 3 indicated on FIGURE 9, the voltage received on movable contact arm 463 is no longer present in the circuit and the voltage then drops back to the value which was driven in on movable contact arm 452 and is equal to the voltage at point 1' which also corresponds to a plateau voltage of point 4 shown in FIGURE 9. Resistor 480 prevents amplifier 346 from seeing an open circuit as movable contact arm 478 is switched from contact 475 to 476. Since potentiometer 451 is the only one of concern at this point, as shaft 485 reaches a position representative of number 5 on FIGURE 9, movable contact arm 448 of switch 444 is moved from contact point 443 to contact point 450 which then reverses polarity on the voltage seen at movable contact arm 452. This then allows a constant voltage to exist on movable contact arm 452 from position 6 to 7 of silvered portion 454 and at point 7 resistive element 455 is brought into the circuit and cam 490 characterizes the portion of the curve from point 7 to 8 of FIGURE 9. Variable resistors 442 and 447 are used to adjust the voltages seen on contact points 443 and 450 respectively so that the voltage is maintained at a predetermined value during the reversing of polarity. A rate signal is also introduced to amplifier 346 by a negative feedback signal from velocity generator 125 which is detected by movable contact arm 380 of potentiometer 377.

Potentiometer 451 may have resistive portions 453 and 455 characterized to simulate portions of the curve shown in FIGURE 9 between points 0 and 1' and 7 and 8 respectively instead of utilizing cam 490.

While we have shown and described the specific embodiment of this invention, the invention should not be limited to the particular form shown, and we intend in the appended claims to cover all modifications which do not depart from the spirit and scope of the invention.

We claim:
1. Air data computer apparatus comprising: first condition responsive means developing a first signal; first motor means energized by said first signal; first differential means providing a first difference signal; means including said first differential means for connecting said first motor means to said first condition responsive means so that said first condition responsive means is adjusted thereby; second condition responsive means developing a second signal; second motor means energized by said second signal; means connecting said second motor means to said second condition responsive means so that said second condition responsive means is adjusted thereby; second differential means connected to the output of said first differential means and said second motor means, said second differential means providing a second difference signal; computing means energized by said second difference signal, said computing means providing a correction signal that is algebraically added to said first difference signal at said first differential means to correct an error received by said first condition responsive means; and third differential means connected to said second motor means and to said first motor means to provide a third difference signal.

2. Air data computer apparatus comprising: first condition responsive means developing a first signal; first positioning means energized by said first signal; first difference means; means including said first difference means for connecting said first positioning means to said first condition responsive means so that said first condition responsive means is adjusted thereby; second condition responsive means developing a second signal; second positioning means energized by said second means; means connecting said second positioning means to said second condition responsive means so that said second condition responsive means is adjusted thereby; computing means providing a correction signal for correcting an error received by said first condition responsive means; second difference means having its inputs driven by said first difference means and said second positioning means, said second difference means driving said computer means; and third difference means having its inputs driven by said second positioning means and said first positioning means to provide an output signal which is representative of an addition of said input signals.

3. Air data computer apparatus comprising: first condition responsive means developing a first signal representative of a first condition; first motor means energized by said first signal; first differential means; means including said first differential means for connecting said first motor means to said first condition responsive means so that said first condition responsive means is adjusted thereby; second condition responsive means developing a second signal representative of a second condition; second motor means energized by said second signal; means connecting said second motor means to said second condition responsive means so that said second condition responsive means is adjusted thereby; second differential means connected to the output of said first differential means and said second motor means, said second differential means providing a second difference signal; and computing means energized by said second difference signal, said computing means providing a correction signal that is combined with said first signal at said first differential means to correct an error received by said first condition responsive means.

4. Air data computer apparatus comprising: first condition responsive means developing a first signal representative of a first condition; first motor means energized by said first signal; first differential means; a plurality of first output signal producing means driven by said first motor means; means including said first differential means for connecting said first motor means to said first condition responsive means so that said first condition responsive means is adjusted thereby; second condition responsive means developing a second signal representative of a second condition; second output signal producing means; second motor means energized by said second signal for driving said second output signal producing means; means connecting said motor means to said second condition responsive means so that said second condition responsive means is adjusted thereby; second differential means connected to the output of said first differential means and to said second motor means, said second differential means providing a second difference signal; error computing means energized by said second difference signal, said computing means providing a correction signal that is combined with said first signal at said first differential means to correct an error received by said first condition responsive means; a plurality of third output signal producing means; third differential means connected to said second motor means and to said first motor means; and means operatively connecting said third differential means to said third output signal producing means.

5. Air data computer apparatus comprising: first condition responsive means developing a first signal; first positioning means energized by said first signal; first differential means; means including said first differential means for connecting said first positioning means to said first condition responsive means so that said first condition responsive means is adjusted thereby; second condition responsive means developing a second signal; second positioning means energized by said second signal; means connecting said second positioning means to said second condition responsive means so that said second condition responsive means is adjusted thereby; correction computing means providing a correction signal for an error received by said first condition responsive means; second differential means having its inputs driven by said first differential means and said second poistioning means, said second differential means driving said computing means; and third differential means having its inputs driven by said second positioning means and said first positioning means to provide an output signal which is a function of said input signals.

6. In air data computing apparatus: signal control means; pressure correction means including said signal control means for producing a correction signal as a function of indicated Mach number, said signal control means changing said correction signal from a finite value to a zero value; indicated static pressure signal producing means; total pressure signal producing means; first connecting means for connecting said indicated static pressure signal producing means to said pressure correction means to produce a true static pressure signal; ratio signal producing means; and second connecting means for connecting said true static pressure signal producing means, and said total pressure signal producing means to said ratio signal producing means for producing a signal which is the ratio of said total pressure to said true static pressure.

7. In combination: a transducer giving a first signal representative of the difference between an input pressure and a rebalance force; means supplying said rebalance force as the sum of two mechanical signals; correction means connected to the last named means for supplying one of said mechanical signals as a function of said rebalance force; motor means connected to said transducer for supplying the other of said mechanical signals in accordance with departure of said first signal from a predetermined value; and output means actuated by said motor means.

8. Apparatus of the class described comprising, in combination:
   a first pressure transducer having a first input connection connected to receive a pressure signal which varies with indicated static pressure, having a second input connection connected to receive a signal which varies with static pressure error, and having an output shaft the position of which varies with variations of true static pressure;
   a second pressure transducer having a first input connection connected to receive a pressure signal which varies with total pressure and having an output shaft the position of which is variable with variations of total pressure;
   mechanical ratio computing means connected to said first and said second pressure transducers and having an output shaft the position of which varies with variations of the ratio between static pressure and total pressure;
   static pressure error signal generating means connected to the output shaft of said ratio computing means and having an output shaft the position of which varies with variations of static pressure error;
   and means mechanically connecting the output shaft of said static pressure error signal generating means to the second input connection of said first pressure transducer to mechanically provide static pressure error correction signal for said first pressure transducer.

9. Apparatus for use with an aircraft having a source of total pressure and a source of indicated static pressure which is in error by an amount dependent upon aircraft speed comprising, in combination:
   first transducer means having an input connected to the source of indicated static pressure, having an input force and providing an output signal which varies with the difference between the input force and the indicated static pressure;
   first motive means connected to said first transducer means and operable to produce an output in accordance with the output signal from said first transducer means;
   second transducer means having an input connected to the source of total pressure, having an input force and providing an output signal which varies with the difference between the input force and the total pressure;
   second motive means connected to said second transducer means and operable to produce an output in accordance with the output signal from said second transducer means;
   means connecting said second motive means to said second transducer to supply the input force thereto;
   static pressure error computing means having an input and operable to produce a signal which varies with aircraft speed;
   means connecting said first motive means and said static pressure error computing means to said first pressure transducer so that the outputs from said first motive means and from said static pressure error computing means combine to produce the input force to said first transducer means;
   and means connecting said last named means and said second motive means to the input of said static error correcting means.

10. Apparatus for use with an aircraft to correct errors in indicated static pressure as a function of aircraft speed comprising, in combination:
- a first transducer operable to produce an output signal in accordance with the difference between indicated static pressure and an input force;
- first motive means connected to said first transducer to receive the output signal therefrom and operable to produce an output signal;
- a second transducer operable to produce an output signal which varies with variations in total pressure;
- second motive means connected to said second transducer to receive the output signal therefrom and operable to produce an output signal;
- computer means having an input and operable to produce an output which varies with aircraft speed;
- connecting means connecting said first motive means and said computer means to said first transducer so that the output from said computer means and the output from said first motive means supply the input force to said first transducer;
- and means connecting said connecting means and said second motive means to the input of said computer means.

11. In an air data computer:
- a first transducer providing an output in accordance with the difference between indicated static pressure and an input force;
- a first motor connected to said first transducer to receive the output therefrom and providing a shaft rotation output;
- a second transducer providing an output which varies with variations in total pressure;
- a second motor connected to said second transducer to receive the output therefrom and providing a shaft rotation output;
- computer means having an input and providing a shaft rotation output which varies as a function of aircraft speed;
- means connecting said computer means and said first motor to said first transducer so that the shaft rotation outputs therefrom supply the input force to said first transducer;
- and means connecting said last named means and said second motor to the input of said computer means.

12. Apparatus for use with an aircraft having a source of indicated static pressure which is in error by an amount dependent upon a predetermined function of the Mach number of the aircraft comprising, in combination:
- variable resistance means so characterized as to approximate the predetermined function of the variation of static pressure error with Mach number;
- first transducer means having an input connected to the source of indicated static pressure, having an input force and providing an output in accordance with the variation between the indicated static pressure and the input force;
- second transducer means providing an output which is a funtcion of total pressure;
- combining means having an input connected to said second transducer means to receive the output therefrom, having an input for receiving a signal which is a function of indicated static pressure and providing an output which varies with the ratio between total pressure and indicated static pressure;
- means connecting said combining means in controlling relation to said variable resistance means;
- first motive means connected to said variable resistance means and operable in accordance with the resistance thereof to produce an output signal which varies approximately with the static pressure error;
- second motive means connected to said first pressure transducer and operable to produce an output signal in accordance with the output therefrom;
- means connecting said first and said second motive means to said first transducer means to supply the input force thereto;
- and means connecting said last named means to said combining means to supply the signal which is a function of indicated static pressure thereto.

References Cited in the file of this patent
UNITED STATES PATENTS

| | | |
|---|---|---|
| 2,714,309 | Redemske | Aug. 2, 1955 |
| 2,828,911 | Lash | Apr. 11, 1958 |
| 3,002,382 | Gardner | Oct. 3, 1961 |